Aug. 22, 1967  D. B. FRASER  3,337,439

ELECTROLYTIC TREATMENT OF QUARTZ

Filed Nov. 9, 1964  2 Sheets-Sheet 1

INVENTOR
D. B. FRASER
BY
ATTORNEY

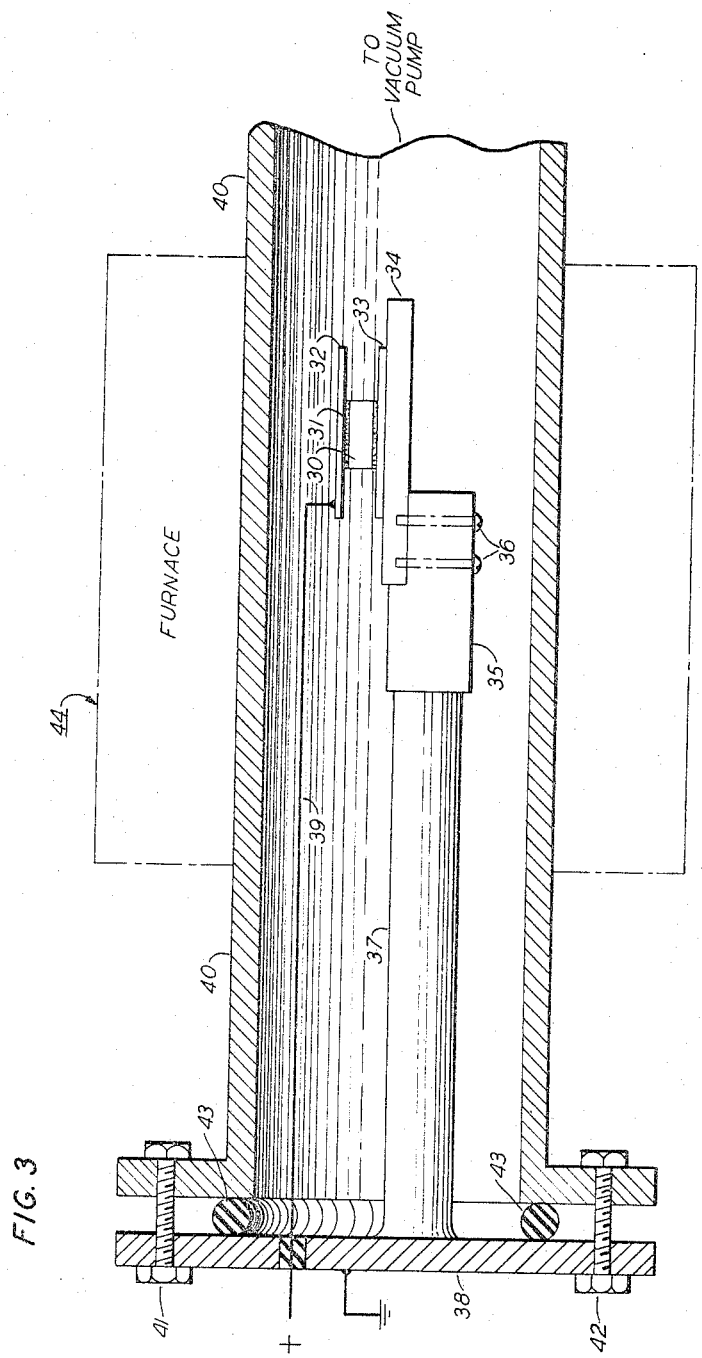

United States Patent Office 3,337,439
Patented Aug. 22, 1967

3,337,439
ELECTROLYTIC TREATMENT OF QUARTZ
David B. Fraser, Berkeley Heights, N.J., assignor to Bell Telephone Laboratories, Incorporated, New York, N.Y., a corporation of New York
Filed Nov. 9, 1964, Ser. No. 409,681
4 Claims. (Cl. 204—164)

ABSTRACT OF THE DISCLOSURE

The disclosure is directed to a method for processing quartz for piezoelectric applications to reduce acoustic absorption. The method involves electrolyzing the quartz in a water-free environment. The absence of water eliminates the possibility of hydrogen, derived from electrolytically dissociated water vapor, from diffusing into the crystal under the influence of the field. Hydrogen associated with oxygen to form $OH^-$ ions, has been implicated in certain unwanted absorption mechanisms in the quartz crystal.

---

This invention relates to the preparation of quartz crystals having exceptional acoustic quality and to devices incorporating their use.

The removal of ionic impurities by electrolytic sweeping is known to significantly affect the acoustic absorption characteristics of quartz crystals. In fact, some samples of synthetically grown quartz have been electrolyzed with the result that the acoustic absorption has been significantly improved. However, this improvement is characteristic only of quartz samples of initially poor acoustic quality. Good quality natural quartz and carefully grown synthetic quartz are generally found to suffer as much as 50 percent in their room temperature absorption as a result of electrolytic treatment. See J. C. King, Final Report: No. 27424-0, June 10, 1960, U.S. Army Signal Research and Development Laboratories, Contract DA 36-039 sc-64586.

It has been theorized that electrolytic treatment of high quality quartz in ordinary air (as suggested by the prior art technique) results in the dissociation of atmospheric water at the anode with the production of hydrogen and the migration of hydrogen into the crystal under the influence of the electrolytic field. The hydrogen associates with oxygen and is detectable by infrared spectrographic analysis as $OH^-$. The $OH^-$ ions have been connected with an acoustic absorption mechanism which, in high quality quartz already devoid of the usual ionic impurities commonly associated with acoustic loss, actually contributes a greater acoustic absorption than that exhibited by the untreated crystal.

Consequently it is generally known that electrolytic treatment would not be expected to produce further improvement in quartz already having high acoustic quality. A qualitative estimate of the meaning of high quality within the context of this discussion would be a specimen having a Q value of over one million.

It has now been found that high quality quartz material can be beneficially treated by electrolytic sweeping to produce quartz having even lower room temperature absorption losses if the electrolytic treatment is carried out in a prescribed manner. The electrolytic treatment according to this invention is conducted in an environment carefully controlled so as to exclude water vapor.

The careful elimination of water vapor from the environment during electrolytic sweeping produces quartz material having unusually low acoustic absorption. In fact the Q values of certain high quality synthetic quartz samples electrolyzed in a controlled environment according to this invention are found to exceed those exhibited by exceptionally high quality natural quartz material. Furthermore, it appears that crystals treated in this manner are found to have improved frequency stability.

Such results are conveniently obtained by electrolyzing the quartz in a vacuum. Satisfactory results are obtained with pressures below $10^{-3}$ mm. Hg. Alternatively the electrolysis may be conducted in a dry gas environment. Gases such as argon, neon, nitrogen, oxygen, dry air and similar nonreactive species are appropriate if the water content of the gas is controlled to less than $10^{-5}$ mm. Hg of water vapor.

These and other aspects of the invention will become more apparent from the following detailed description. In the drawing:

FIG. 3 is a schematic representation of an apparatus useful for carrying out the method of this invention.

Figure 1:
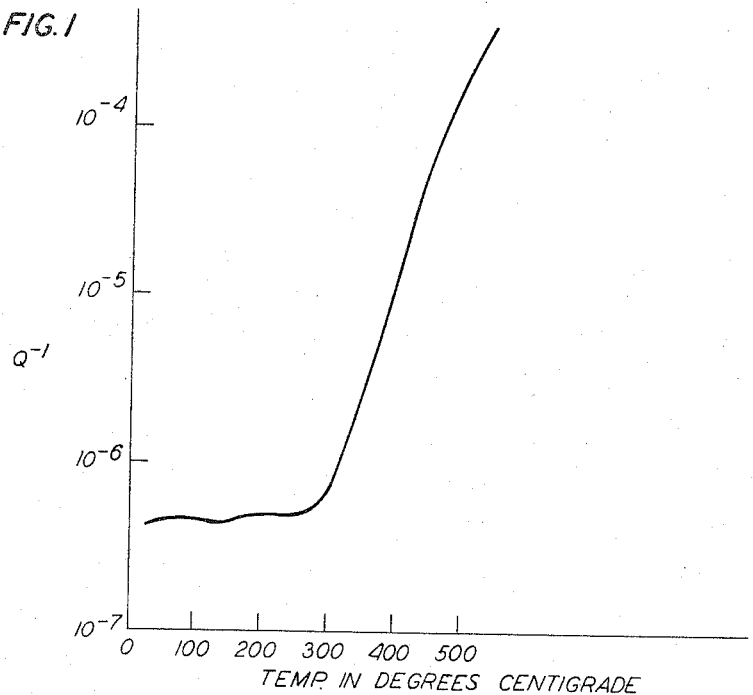
FIG. 1 is a curve plotting the acoustic absorption factor ($Q^{-1}$) vs. temperature for a high quality synthetic quartz sample, resonating at 5 mc.

In FIG. 1 the acoustic absorption, plotted as reciprocal Q ($Q^{-1}$), is shown as a function of temperature for a synthetic quartz sample of exceptional quality (Sawyer-optical grade). The sample is z-growth, AT-cut resonating at 5 mc., 5th overtone. The crystal is a plano-convex plate approximately 1.5 cm. in diameter. The room temperature Q is approximately $2.4 \times 10^6$.

Figure 2:
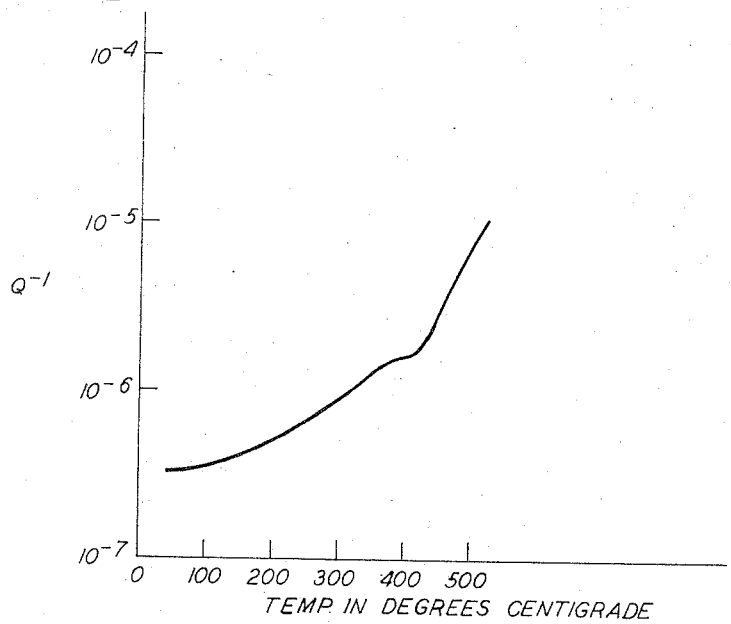
FIG. 2 is a curve similar to that of FIG. 1 for a similar sample electrolyzed in vacuum according to the teachings of this invention.

A similar synthetic quartz sample was measured in the same manner with the exception that this sample had been previously electrolyzed in an essentially water-free environment according to the teachings of this invention. The environment was air evacuated to a pressure of $10^{-6}$ thus giving a water vapor content of approximately $10^{-7}$ mm. Hg. The data is plotted in FIG. 2. The room temperature Q for the treated crystal is almost $3 \times 10^6$. This is an exceptionally high Q value which generally is only obtained in the finest natural quartz specimens. The operating temperature range over which improvement is obtained using the treatment of this invention is considered to be restricted to below 100° C.

The electrolytic treatment used to obtain the data reported here was performed with the apparatus shown schematically in FIG. 3. In FIG. 3 a quartz crystal block 30, coated with gold electrodes 31 along two opposing major faces is supported between platinum plates 32 and 33 on a grounded copper plate 34. The platinum plates serve to evenly distribute the current over the entire area of the quartz block. The copper support plate 34 is attached to a recessed portion of a copper plug 35 by stainless steel screws 36. The plug is fitted onto the end of a thin-walled (10 mil) stainless steel tube 37. The flanged end of the tube is brazed to a copper end plate 38. Electrical connections are made to the upper platinum plate by wire 39 and the lower plate 33 is grounded through the sleeve 37 and end plate 38. The end plate, carrying the support assembly is fitted into a 3½″ ID stainless steel tube enclosure 40 bolted in place with bolts 41, 42 and sealed with O ring 43. The other end of the tube enclosure 40 communicates with a vacuum source, not shown. The region of the enclosure tube proximate to the quartz sample is placed in a furnace shown schematically at 44.

Appropriate electrolytic process conditions are known in the art. For the purposes of this invention a field value of at least 400 volts/cm. at a temperature of at least 350° C. is considered minimum. At higher field values and temperatures the process proceeds more rapidly. A maximum temperature of 550° C. is imposed by the transition temperature of the crystal. Field values in excess of $10^6$ volts/cm. may not be found to be practical. The preferred operating conditions are prescribed by the ranges 1–3 kv./cm. field intensity, 400° C. to 520° C. Using values within these ranges treatment times of the order of at least ten hours are required. The conditions used for the sample on which the data of FIG. 2 was obtained was electrolyzed at 500° C. with a field value of 2000 volts/cm. and a treatment time of twenty hours.

It has been found that in some cases the electrolyzed crystal is further improved by removing the field and annealing the crystal for a period of at least five hours at a temperature in the range prescribed for the electrolyzing temperature. This step is most conveniently effected by merely removing the field from the crystal and annealing it in the same apparatus and at the same temperature for an additional few hours. It is not necessary to control the atmosphere during the anneal. Annealing in air has been found to be satisfactory. In a typical case this annealing step performed on a crystal electrolyzed in vacuum resulted in a further improvement in the room temperature Q value of from $2 \times 10^6$ (preanneal) to $2.8 \cdot 10^6$.

These and other aspects of the invention will become apparent to those skilled in the art. All such variations and deviations which basically rely on the teachings through which this invention has advanced the art are properly considered within the spirit and scope of this invention.

What is claimed is:

1. A quartz crystal for use in a crystal resonator comprising a quartz crystal which has been treated in an electric field of at least 400 volts/cm. at a temperature of at least 400° C. for a period of at least ten hours while maintaining the crystal in an environment having a pressure below $10^{-3}$ mm. Hg.

2. A method for processing quartz material which comprises treating the quartz material in an electric field of at least 400 volts/cm. at a temperature of at least 400° C. for a period of a least ten hours while maintaining the material in an atmosphere substantially free of hydrogen and having less than $10^{-5}$ mm. Hg water vapor as measured at room temperature and thereafter annealing the quartz material at a temperature of at least 400° C. for a period of at least five hours.

3. The method of claim 2 wherein the atmosphere is air at a pressure below $10^{-3}$ mm. Hg.

4. The method of claim 2 wherein the atmosphere is a dry gas selected from the group consisting of neon, argon, nitrogen, and oxygen.

References Cited

UNITED STATES PATENTS

| | | | |
|---|---|---|---|
| 2,754,259 | 7/1956 | Robinson et al. | 204—142 |
| 3,228,761 | 1/1966 | Henderson et al. | 65—117 |

FOREIGN PATENTS

| | | |
|---|---|---|
| 1,301,149 | 7/1962 | France. |

JOHN H. MACK, *Primary Examiner.*

ROBERT K. MIHALEK, *Examiner.*